W. T. UTLEY.
Harvester.
No. 227,325. Patented May 4, 1880.
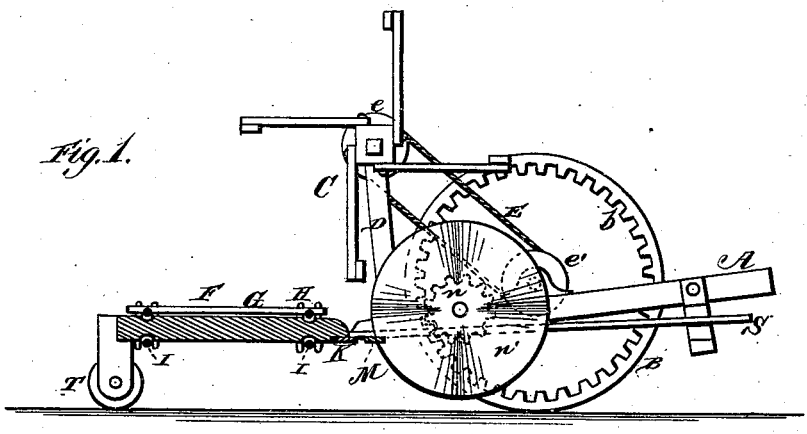
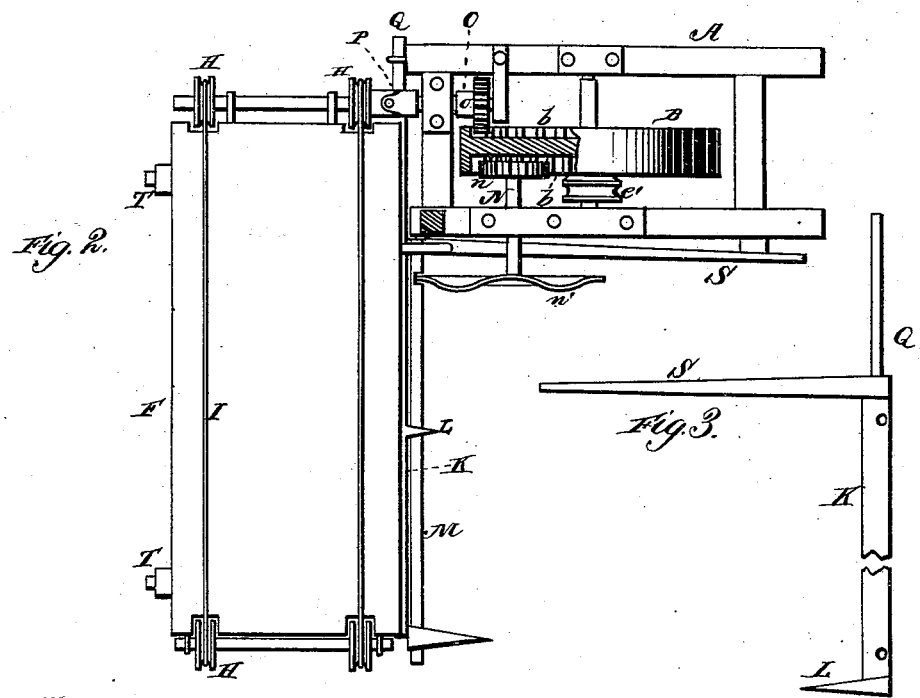
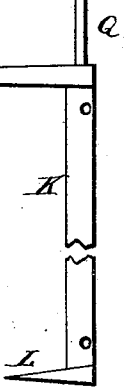
WITNESSES
Robert Everett
James J. Sheehy
INVENTOR
William T. Utley
Gilmore, Smith & Co.
ATTORNEYS

UNITED STATES PATENT OFFICE.

WILLIAM T. UTLEY, OF BEDFORD, MISSOURI.

HARVESTER.

SPECIFICATION forming part of Letters Patent No. 227,325, dated May 4, 1880.

Application filed November 8, 1879.

*To all whom it may concern:*

Be it known that I, WILLIAM T. UTLEY, of Bedford, in the county of Livingston and State of Missouri, have invented certain new and useful Improvements in Harvesters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my improved harvester, partly in section. Fig. 2 is a plan view of the same, partly in section. Fig. 3 is a detail view.

My present invention relates to harvesters; and it consists in the construction and arrangement of certain parts, as will be fully set forth in the following description, and particularly pointed out in the claim.

In the drawings, A designates the main frame, in which is journaled the axis of the driving-wheel B; and C designates the reel, which is mounted upon a standard, D, and rotated by means of the endless belt E, which passes around the pulley-wheels $ee'$, the former being upon the axis of the reel and the latter upon the axis of the driving-wheel.

F designates the grain-platform, which is arranged in rear of the main frame A, and which carries the rakes or conveyers G, the pulley-wheels H, around which are passed the rake-bands I, the finger-bar and fingers K L, and the reciprocating sickle-bar M.

The driving-wheel B is formed with internal gear-teeth $b$ upon one of its sides, for the purpose of imparting motion to the sickle-bar. Upon the main frame is mounted a shaft, N, parallel with the axis of the driving-wheel, and carrying upon one end a pinion, $n$, which gears with internal gear-teeth $b$, and upon its other end a waved or convoluted disk-wheel, $n'$, which projects into a notch or recess formed in the front edge of the sickle-bar, so as to impart to the said bar the usual reciprocating movement.

A shaft, O, is mounted upon the rear of the main frame in line with the side of the driving-wheel, one end of said shaft being provided with a pinion, $o$, which gears with one of the lines of gear-teeth $b$, while its other end connects with one of the shafts which carries the pulleys at one end of the platform by means of a universal joint, P.

The platform is hinged to the rear of the main frame by means of a rod, Q, connected with the platform and passed through suitable bearings on the main frame.

S designates a lever, which is pivoted upon the main frame and connected with the platform for the purpose of raising or lowering the sickle-bar. The forward end of this lever is adjusted in position by means of a rack upon the main frame.

Upon the under side of the platform, and at its rear side, are suitable supporting caster-wheels T, constructed and arranged in any convenient manner.

What I claim is—

In a harvester, the platform F I and the rod Q, made rigid with and continuous from the finger-bar, and by means of which the platform is hinged to the rear end of the main frame, in combination with the lever S, rigidly attached to the finger-bar, to constitute at the same time a lifting-lever and support and a securing ratchet or rack at the front inner side of the main frame, substantially as and for the purposes set forth.

In testimony that I claim the above I have hereunto subscribed my name in the presence of two witnesses.

WILLIAM T. UTLEY.

Witnesses:
ANDREW HALL,
THEO. FERRELL.